US007539151B2

(12) United States Patent
Demirhan et al.

(10) Patent No.: US 7,539,151 B2
(45) Date of Patent: May 26, 2009

(54) CHANNEL SELECTION FOR MESH NETWORKS HAVING NODES WITH MULTIPLE RADIOS

(75) Inventors: Mustafa Demirhan, Hillsboro, OR (US); Mousumi Hazra, Beaverton, OR (US); W. Steven Conner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 737 days.

(21) Appl. No.: 11/171,577

(22) Filed: Jun. 30, 2005

(65) Prior Publication Data
US 2007/0002794 A1   Jan. 4, 2007

(51) Int. Cl.
*H04L 12/56* (2006.01)
*H04J 1/16* (2006.01)

(52) U.S. Cl. .................... 370/254; 370/252; 370/238

(58) Field of Classification Search ............... 370/278, 370/252, 328, 329, 400, 401, 238, 419, 254; 709/238–242
See application file for complete search history.

(56) References Cited

U.S. PATENT DOCUMENTS

| 2003/0212830 | A1* | 11/2003 | Greenblat et al. | ........... 709/251 |
| 2004/0185887 | A1 | 9/2004 | Wolman et al. | |
| 2006/0268908 | A1* | 11/2006 | Wang et al. | ................. 370/401 |

FOREIGN PATENT DOCUMENTS

WO   WO-2004014025 A1   2/2004

OTHER PUBLICATIONS

Raniwala, A., et al., "Centralized Channel Assignment and Routing Algorithms for Multi-Channel Wireless Mesh Works", *ACM Sigmobile Moble Computing and Communications Review*: 8 (2):. (Apr. 2004),50-65.

* cited by examiner

*Primary Examiner*—John Pezzlo
(74) *Attorney, Agent, or Firm*—The Law Offices of John C. Scott, LLC; John C. Scott

(57) ABSTRACT

Channels are selected for nodes in a wireless mesh network in a mananer that enhances connectivity and throughput in the network. For a node in the network, channel configurations are first identified that satisfy a predetermined connectivity constraint with respect to neighbor nodes of the node. A channel configuration is then selected from the identified configurations based on an achievable throughput of the configuration.

18 Claims, 4 Drawing Sheets

CHANNEL SELECTION FOR MESH NETWORKS HAVING NODES WITH MULTIPLE RADIOS

TECHNICAL FIELD

The invention relates generally to wireless networks and, more particularly, to techniques and structures for selecting channels for nodes within wireless networks.

BACKGROUND OF THE INVENTION

A wireless mesh network is a network of wireless nodes that are each capable of communicating, either directly or by two or more hops, with other wireless nodes in the network. In a wireless mesh network, each of the nodes may include multiple radios for use in communicating with other nodes. Each of the radios within a node may be capable of operation in any of a number of different channels. There is a need for techniques and structures that are capable of efficiently and effectively selecting the channels to be used by the nodes of a wireless mesh network.

DETAILED DESCRIPTION

Figure 1:
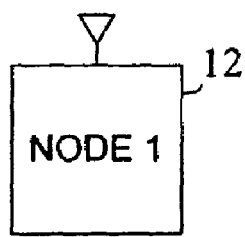
FIG. 1 is a diagram illustrating an example of a wireless mesh network in accordance with an embodiment of the present invention.
Figure 1:
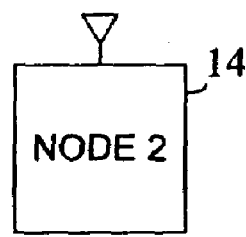
Figure 1:
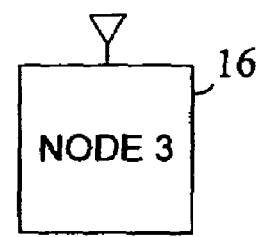
Figure 1:
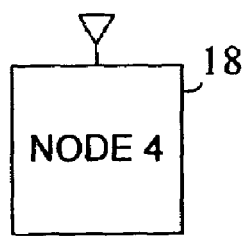
Figure 1:
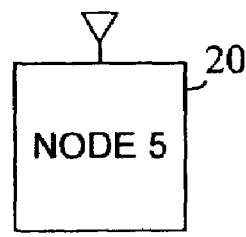
Figure 1:
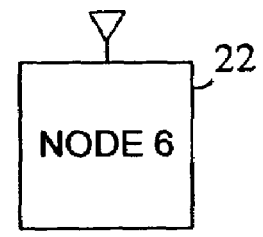
Figure 1:
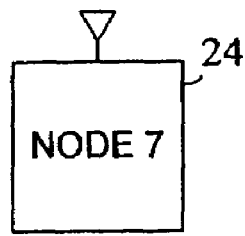
Figure 1:
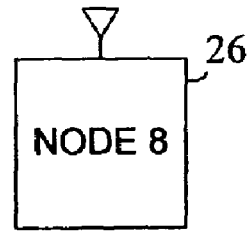
Figure 1:
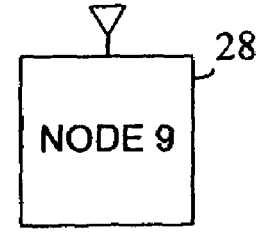

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating an example of a wireless mesh network 10 in accordance with an embodiment of the present invention. As shown, the wireless mesh network 10 includes a number of wireless nodes 12, 14, 16, 18, 20, 22, 24, 26, 28 (NODES 1-9) that are each capable of communicating wirelessly with the other nodes in the network. Any type of wireless nodes may be present within the network 10. For example, one or more of the wireless nodes 12, 14, 16, 18, 20, 22, 24, 26, 28 may be a wireless client device (e.g., a computer having wireless networking functionality, a personal digital assistant having wireless networking functionality, a cellular telephone or other handheld wireless communicator, and/or others), one or more of the wireless nodes 12, 14, 16, 18, 20, 22, 24, 26, 28 may be a wireless access point or base station, and so on. Some or all of the nodes in the network 10 may include multiple radios for use in supporting wireless communication in the network. For example, a first wireless node 12 may include 3 different IEEE 802.11g wireless network interface cards (or other types of radio). Each of the radios within a wireless node may be capable of operation within a number of different channels. For example, an IEEE 802.11g wireless network interface card may be capable of operating within 13 different frequency channels that (a) utilize overlapping frequencies (channels 1, 6, and 11 do not overlap) and (b) each have a center frequency that is 5 megaHertz (MHz) from the center frequency of an adjacent channel (e.g., U.S. frequencies 2412, 2417, 2422, . . . , and 2472 MHz). A decision needs to be made as to which channels to use within each of the nodes of a wireless mesh network. In at least one aspect of the present invention, techniques and structures are provided that are capable of selecting operating channels for each of the nodes of a wireless mesh network in a manner that improves connectivity in the network while also enhancing the overall throughput in the network.

In the mesh network 10 of FIG. 1, each of the network nodes 12, 14, 16, 18, 20, 22, 24, 26, 28 may not be capable of communicating directly with all of the other nodes in the network. For example, node 12 may be out of range of node 28 and thus not able to communicate by direct wireless link. As used herein, the term "neighbor node" is used to denote a node that is within the hearing range of another node. Sometimes a first node may not be within hearing range of a second node, but it may be within the hearing range of a neighbor node of the second node. In this case, the first node may be referred to as a two-hop neighbor node of the second node. In practice, nodes in a mesh network may be in any physical configuration at any particular time and one or more of the nodes may be in motion. The identity of neighbor nodes may depend upon factors such as, for example, the proximity of the nodes, the transmit power levels being used, receiver sensitivity, obstructions between nodes, and/or other factors.

Figure 2:
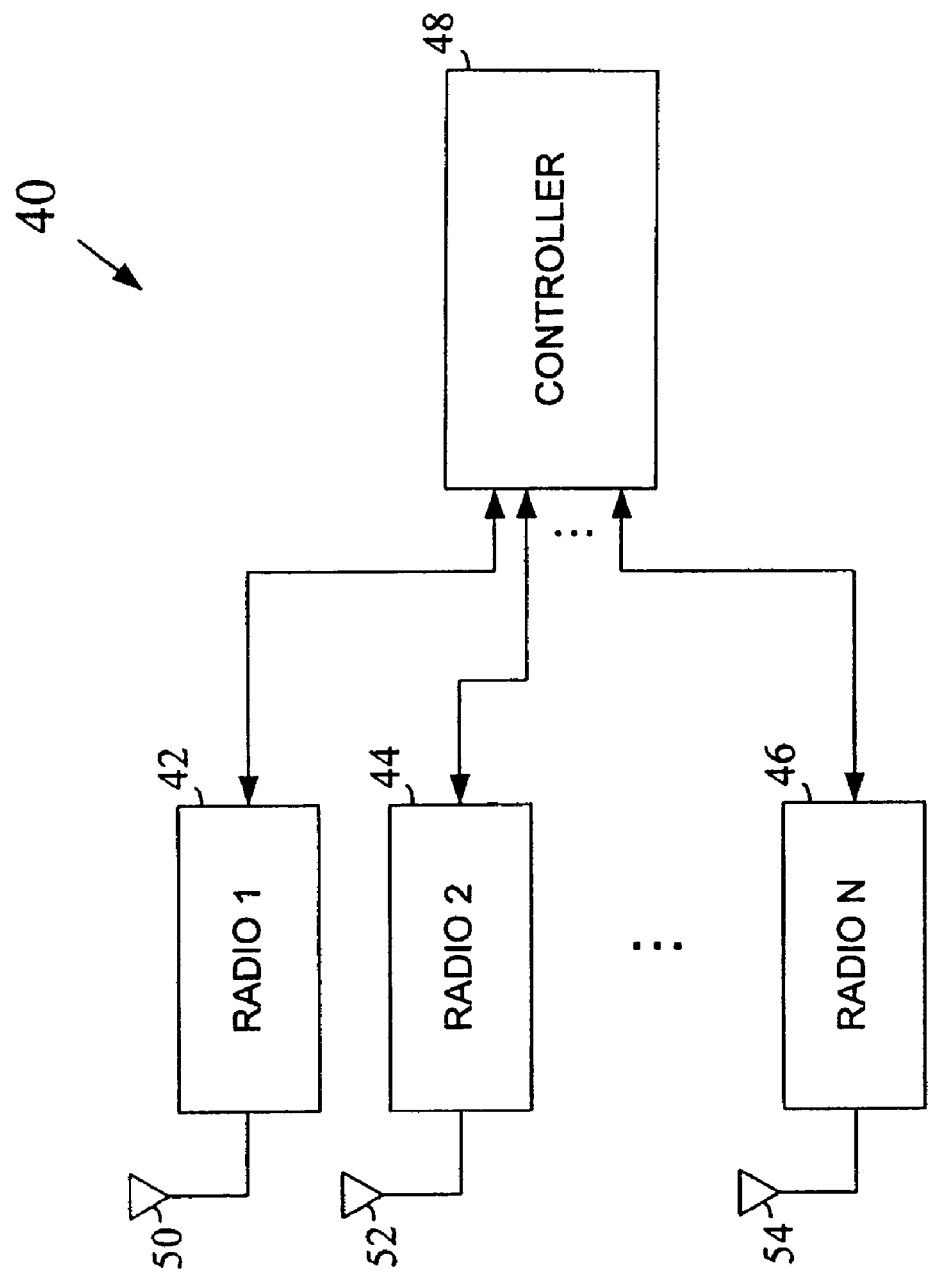
FIG. 2 is a block diagram illustrating an example of a wireless node that may be part of a wireless mesh network in accordance with an embodiment of the present invention.

FIG. 2 is a block diagram illustrating an example of a wireless node 40 that may be part of a wireless mesh network in accordance with an embodiment of the present invention. As illustrated, the wireless node 40 may include a plurality of radios 42, 44, 46 that are each capable of supporting a wireless link with another wireless node in an associated network. The wireless node 40 may also include a controller 48 to, among other things, coordinate the operation of the radios 42, 44, 46. The controller 48 may include, among other things, one or more digital processing devices. The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Each of the radios 42, 44, 46 may be coupled to one or more corresponding antennas 50, 52, 54 to facilitate the transmission and reception of wireless signals. Any type of antenna may be used including, for example, dipole antennas, patch antennas, helical antennas, microstrip antennas, antenna arrays, and/or others. Any number of radios may be present within a wireless node.

The radios 42, 44, 46 may each be, for example, a wireless network interface card or other wireless network interface structure. Other types of radio may alternatively be used. The radios 42, 44, 46 may be separate structures or they may be integrated into a single component. Likewise, the radios 42, 44, 46 may be removable structures that are inserted into a port or slot of a host device or they may be structures that are an integral part of a host device. The radios 42, 44, 46 may be configured in accordance with one or more wireless standards, which can include wireless networking standards, wireless cellular standards, and/or other wireless standards. Each of the radios 42, 44, 46 will typically be capable of operation within any of a number of different channels. For example, as described above, an IEEE 802.11g wireless network interface card may be capable of operation within 13 different frequency channels. Other radios may be capable of operation within multiple different code channels, time-based channels, and/or other types of channels. A channel needs to be selected for each of the radios 42, 44, 46 within the wireless node 40 before the node is used in a corresponding wireless mesh network.

Figure 3:
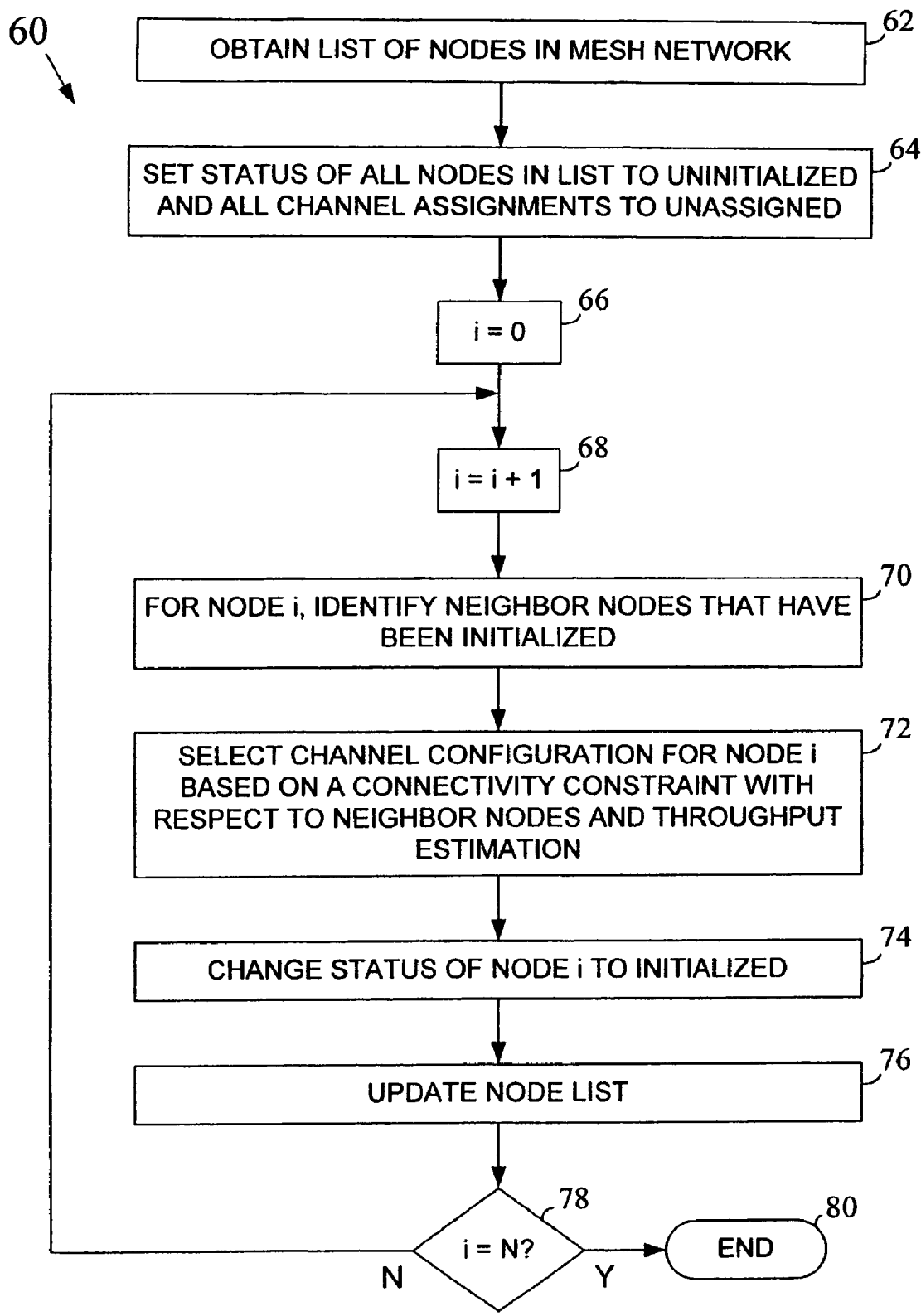
FIG. 3 is a flowchart illustrating an example of a method for use in selecting channels for nodes in a wireless mesh network in accordance with an embodiment of the present invention.

FIG. 3 is a flowchart illustrating an example of a method 60 for use in selecting channels for nodes in a wireless mesh network in accordance with an embodiment of the present invention. The method 60 may be used in connection with, for example, the wireless mesh network 10 of FIG. 1 to assign channels to the radios within the corresponding nodes 12, 14, 16, 18, 20, 22, 24, 26, 28. The method 60 may also be used within other mesh networks. The method 60 may be performed within one of the nodes of a mesh network (e.g., within controller 48 of node 40 in FIG. 2, etc.), within a centralized location in a mesh network that is not a wireless node, or in a distributed fashion throughout a mesh network. The method 60 may also be performed in a location outside of the mesh network. As illustrated, a list of the nodes in the mesh network is first obtained (block 62). The node list may be maintained, for example, as part of a network management function in the network. To obtain enhanced benefit from the method 60, the node list may be ordered in a manner that is related to the proximity of the individual nodes to one another. That is, nodes that are physically close to one another should also be close to one another within the list. Next, the status of all of the nodes within the list should be set to "uninitialized" (block 64). The status of "uninitialized" is used to indicate that channels have not yet been selected for a corresponding node. All of the channel assignments for the nodes in the network may also be set to "unassigned" at this time.

A node index i is next initialized to zero (block 66). The node index i is used to sequentially iterate through the nodes on the node list. The node index i is then incremented by 1 to indicate the node in the list that is currently being processed (block 68). The neighbor nodes of node i that have already been initialized are next identified (block 70). A channel configuration is then selected for node i based on a predetermined connectivity constraint with respect to the identified neighbor nodes and also throughput concerns (block 72). The connectivity constraint with respect to the neighbor nodes is a constraint that is intended to ensure a desired level of connectivity within the network. Out of all the channel configurations that satisfy the connectivity constraint, a channel configuration may be selected that is intended to maximize throughput in the network. After the channel configuration has been selected for node i, the status of node i is changed to "initialized" (block 74). The node list may then be updated with the new channel configuration information for node i (block 76). It is next determined whether all of the nodes in the list have been processed (i.e., whether i=N, where N is the number of nodes in the list) (block 78). If not, then the method 60 returns to block 68 and the node index i is incremented by 1. The next node in the list is then processed as described above. The process is then repeated for each of the remaining nodes in the list.

On the first pass through the method 60, all of the nodes in the mesh network are uninitialized. Therefore, there are no initialized neighbor nodes of node 1 and all possible channel configurations for node 1 are valid. In addition, because no channel assignments have yet been made, all of the possible channel configurations for node 1 have the same achievable throughput. For these reasons, any possible channel configuration may be selected for the first node in the list (i.e., node 1) in block 72. On each subsequent iteration, however, there will be initialized nodes in the network and the connectivity constraint will come into play in block 72. In one approach, the connectivity constraint may require that at least one common channel be assigned to a node for each of the identified neighbor nodes. Other connectivity constraints may alternatively be used.

Eventually, all of the nodes in the list will have been processed and the method 60 will end (block 78-Y and block 80). The updated node list may then be distributed to the nodes of the network, which may then configure their radios accordingly. In one approach, the method 60 may be separately performed within each of the nodes of the network, using the same node list. As will be appreciated, any number of different techniques may be used to distribute the channel configurations to the nodes when available.

Figure 4:
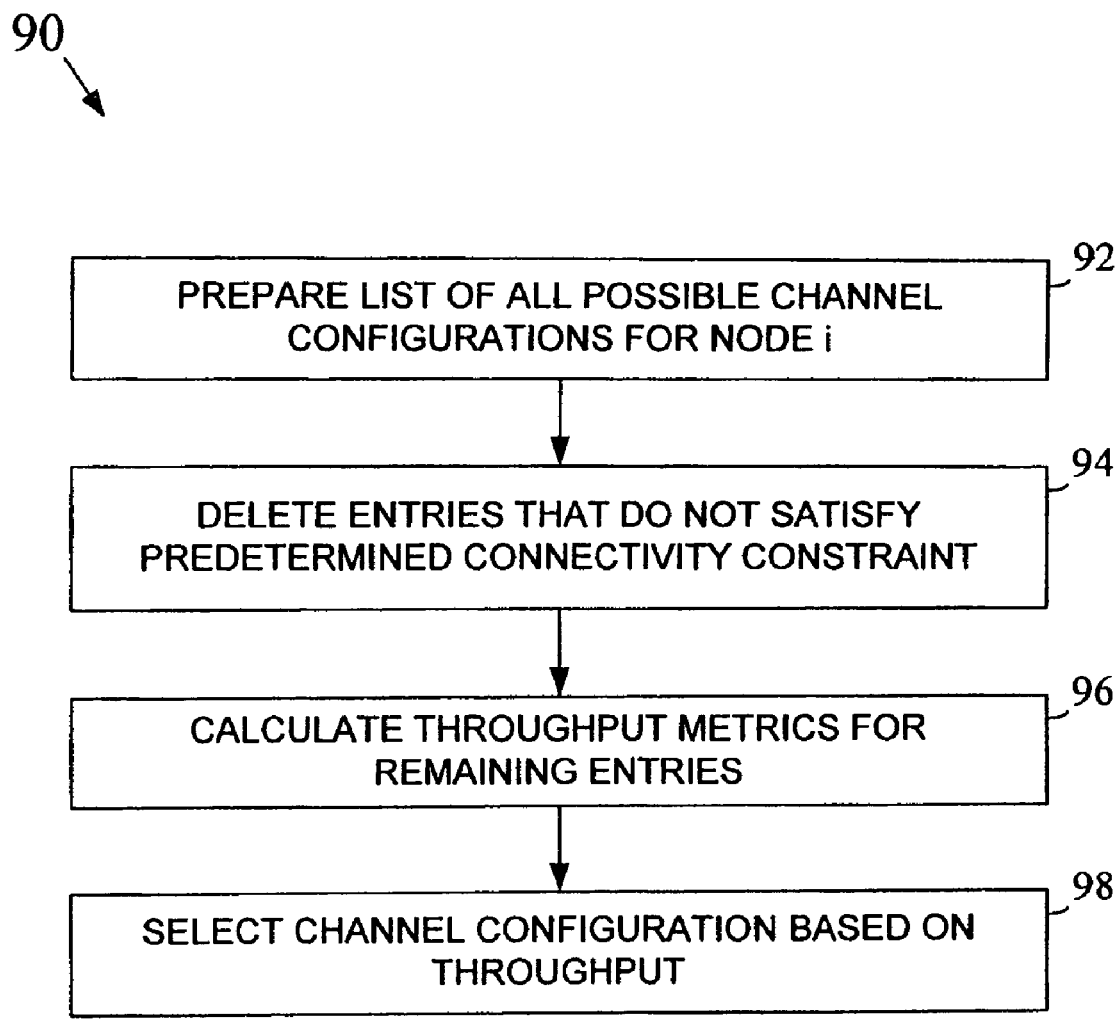
FIG. 4 is a flowchart illustrating an example of a method for use in selecting a channel configuration for a node in a wireless mesh network in accordance with an embodiment of the present invention.

FIG. 4 is a flowchart illustrating an example of a method 90 for use in selecting a channel configuration for a node in a wireless mesh network in accordance with an embodiment of the present invention. The method 90 may be used, for example, as part of the method 60 of FIG. 3 (e.g., in block 72) or in other channel allocation methods. First, a list of all possible channel configurations of the subject node is prepared (block 92). For example, if the node has three radios that are each capable of using one of 12 available channels, then there will be $^{12}C_3=220$ possible channel configurations for the node. Channel configurations that do not satisfy the predetermined connectivity constraint are then removed from the list (block 94). For example, if the connectivity constraint requires at least one common channel with each initialized neighbor node, then all channel configurations that do not include at least one common channel with each initialized neighbor node will be removed from the list. The remaining list will therefore include channel configurations that satisfy the connectivity constraint.

Throughput metrics are next calculated for the remaining entries on the list to provide an indication of the throughput that may be achievable when using each channel configuration (block 96). Achievable throughput metrics may be calculated in a variety of different ways. In at least one approach, achievable throughput may be estimated using the total number of direct initialized neighbors and the total number of two hop initialized neighbors of a given node that are using a particular channel. For example, assuming that the traffic load on the various nodes is similar, the achievable throughput percentage metric for a node using channel n may be estimated as:

$$TP = \frac{(100)}{((\text{\# of direct neighbors using channel } n) + (\text{\# of two hop neighbors using channel } n))}$$

For a particular channel configuration, the above metric may be calculated for each of the channels of the configuration. An overall throughput metric for the channel configuration may then be calculated by combining the individual channel throughput metrics (e.g., adding, multiplying, etc.). The above equation assumes that a node's transmission is affected by 1 and 2 hop neighbors only (i.e., a mesh node can achieve spatial reuse with 3 or more hop neighbors). If, however, a mesh node's operation is affected by 3 (or more) hop neighbors, the throughput calculation should consider the 3 (or more) hop neighbors. After the throughput metrics have been calculated, a channel configuration may be selected for the node that results in a highest achievable throughput (block 98).

An example of the operation of the method 60 of FIG. 3 is now presented. The example will assign channel configurations to the nodes 12, 14, 16, 18, 20, 22, 24, 26, and 28 of the mesh network 10 of FIG. 1. In the discussion that follows, it will be assumed that the neighbor nodes of a given node in the mesh network 10 of FIG. 1 are the horizontally adjacent nodes, the vertically adjacent nodes, and the diagonally adjacent nodes of the subject node. Thus, with reference to FIG. 1, nodes 14, 18, and 20 are all neighbor nodes of node 12; nodes 12, 18, 20, 22, and 16 are all neighbor nodes of node 14; and so on. It will also be assumed that each node in the network 10 has three radios and each radio has 9 available channels (channels 1 through 9). In practice, any number of radios may be present within a node and any number of channels may be available for each radio.

A node list is first obtained that lists the 9 nodes of the network 10. The status of the nodes are all set to uninitialized. Node 12 is first processed. A configuration list is prepared for node 12 that includes all of the possible channel configurations for node 12. As all of the nodes in the network are uninitialized at this point, there are no initialized neighbor nodes for node 12. Thus, no entries are deleted from the configuration list. In addition, none of the channels have yet been assigned. Therefore, all of the channel configurations have equal achievable throughput. Any of the listed configurations may therefore be selected for node 12. Assume that channels 1, 2, and 3 are selected as the channel configuration for node 12. The status of node 12 is now changed to initialized and the node list is updated with the channel configuration information.

Node 14, the second node on the node list, is now processed. Node 14 has one initialized neighbor node (i.e., node 12). A configuration list is prepared that includes all of the possible channel configurations for node 14. The connectivity constraint requires at least one common channel with each initialized neighbor node. Therefore, all entries in the configuration list that do not include at least one of channel 1, channel 2, and channel 3 (the three channels used by node 12) are now removed from the configuration list. Achievable throughput metrics may now be calculated for the configurations in the modified configuration list. All of the channel configurations on the list that include only one of channel 1, channel 2, and channel 3 will have the same (and highest) achievable throughput value. Any of these channel configurations may be selected for node 14. Assume that the channel configuration having channel 1, channel 4, and channel 5 is selected for node 14.

The method now proceeds to node 16, the third node in the node list. Node 16 has one initialized neighbor node (i.e., node 14) and one initialized two-hop neighbor node (i.e., node 12). A configuration list is prepared that includes all of the possible channel configurations for node 16. All entries in the configuration list that do not include at least one of channel 1, channel 4, and channel 5 (the three channels used by node 14) are now removed from the configuration list. Achievable throughput metrics may now be calculated for the remaining channel configurations in the list. The channel configuration that is selected should have only one of channel 1, channel 4, or channel 5 to achieve a highest achievable throughput. In addition, achievable throughput may be further enhanced by selecting a channel configuration that does not include any of channel 1, channel 2, and channel 3 (i.e., the channels used by two-hop neighbor node 12). Assume that the channel configuration having channel 4, channel 6, and channel 7 is selected for node 16. As channel 6 and channel 7 were previously unassigned, they will not decrease the throughput achievable by node 16.

The method now proceeds to node 18, the fourth node in the node list. Node 18 has two initialized neighbor nodes (i.e., nodes 12 and 14) and one initialized two-hop neighbor node (i.e., node 16). A configuration list is prepared that includes all of the possible channel configurations for node 18. All entries in the configuration list that do not include at least one of channel 1, channel 2, and channel 3 and at least one of channel 1, channel 4, and channel 5 are now removed from the configuration list. Achievable throughput metrics are then calculated for all of the remaining configurations on the list. Because channel 1 is used by both node 12 and node 14, it is avoided as it will decrease achievable throughput. Likewise, channel 4 is used by both node 14 and node 16 and will be avoided. Therefore, channel 2 and channel 5 are selected as the common channels with direct neighbor nodes 1 and 2, respectively. A previously unassigned channel (e.g., channel 8) may be used to complete the channel configuration for node 18. Thus, the channel configuration having channel 2, channel 5, and channel 8 is selected for node 18.

The method now proceeds to node 20, the fifth node in the node list. Node 20 has 4 initialized direct neighbor nodes (i.e., nodes 12, 14, 16, and 18) and no initialized two-hop neighbor nodes. A configuration list is prepared that includes all of the possible channel configurations for node 20. All entries in the configuration list that do not include at least one common channel with nodes 12, 14, 16, and 18 are removed from the configuration list. Achievable throughput metrics are then calculated for all of the remaining configurations on the list. The channel configuration that results in the highest achievable throughput is determined to be the configuration that includes channel 1, channel 6, and channel 8. This configuration is selected for node 20. The same procedure is followed for the remaining nodes on the node list and the following channel configuration selections result: node 22 uses a configuration having channels 4, 6, and 7; node 24 uses a configuration having channels 6, 8, and 9; node 26 uses a configuration having channels 7, 8, and 9; and node 28 uses a configuration having channels 1, 7, and 9.

The computational complexity of the above-described method increases linearly (O(n)) as the number of nodes in the network increases. The method is therefore efficient for use in high density networks. The method effectively decouples the channel assignment function from the mesh routing problem within a wireless mesh network. However, if the method is used to allocate the channels in a wireless mesh network, it will typically increase the likelihood that a mesh routing algorithm will be able to find contention free paths between any two nodes in the network. A contention free path in a wireless mesh network may be defined as a path where communication between two neighbors on the path does not interfere with communication between any other two neighbors on the path.

In at least one embodiment, the inventive process is repeated often in a wireless mesh network to maintain an enhanced level of connectivity and throughput in the network. For example, in one approach, the process may be repeated every time there is a change in the node list (e.g., when a new node enters the network, an old node leaves the network, etc.). In another approach, the process may be repeated at fixed time intervals or at other predetermined times. Other repetition strategies may alternatively be used. The inventive techniques may be implemented in any type of wireless mesh network, including IEEE extended service set (ESS) mesh networks and others.

The techniques and structures of the present invention may be implemented in any of a variety of different forms. For example, features of the invention may be embodied within cellular telephones and other handheld wireless communicators; personal digital assistants (PDAs) having wireless capability; laptop, palmtop, desktop, and tablet computers having wireless capability; pagers; satellite communicators; audio/video/multimedia devices and other appliances having wireless capability; network interface cards (NICs) and other network interface structures; wireless access points and base stations; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use in allocating channels in a wireless mesh network having multiple nodes, comprising:
   identifying, for an uninitialized node in the wireless mesh network, neighbor nodes that have been initialized, said neighbor nodes being capable of supporting a direct wireless link with said uninitialized node, wherein an initialized node is a node that already has assigned channels;
   generating a list of channel configurations for said uninitialized node that satisfy a predetermined connectivity constraint with respect to said identified neighbor nodes;
   calculating throughput metrics for channel configurations on said list; and
   selecting a channel configuration for said uninitialized node based on said throughput metrics.

2. The method of claim 1, further comprising:
   changing a status of said uninitialized node to initialized after selecting a channel configuration.

3. The method of claim 2, further comprising:
   repeating identifying, generating, calculating, selecting, and changing for another uninitialized node in the wireless mesh network.

4. The method of claim 2, further comprising:
   acquiring a list of nodes in the wireless mesh network and changing a status of all nodes on said list of nodes to uninitialized before identifying neighbor nodes, wherein said uninitialized node is a first node on said list of nodes.

5. The method of claim 4, further comprising:
   repeating identifying, generating, calculating, selecting, and changing for all nodes on said list of nodes, other than said first node, after changing said status of said first node.

6. The method of claim 4, wherein:
   said list of nodes is organized based on proximity between the listed nodes.

7. The method of claim 1, wherein:
   said predetermined connectivity constraint requires at least one common channel with each of said identified neighbor nodes.

8. The method of claim 1, wherein:
   calculating throughput metrics for channel configurations on said list includes calculating a metric for a channel n using the following equation:

$$TP = \frac{(100)}{((\text{\# of direct neighbors using channel } n) + (\text{\# of two hop neighbors using channel } n))}.$$

9. An article comprising a computer readable storage medium having instructions stored thereon that, when executed by a computing platform, operate to:
   identify, for an uninitialized node in a wireless mesh network, neighbor nodes that have been initialized, said neighbor nodes being capable of supporting a direct wireless link with said uninitialized node, wherein an initialized node is a node that already has assigned channels;
   generate a list of channel configurations for said uninitialized node that satisfy a predetermined connectivity constraint with respect to said identified neighbor nodes;
   calculate throughput metrics for channel configurations on said list; and
   select a channel configuration for said uninitialized node based on said throughput metrics.

10. The article of claim 9, wherein said instructions further operate to:
    change a status of said uninitialized node to initialized after said channel configuration has been selected.

11. The article of claim 10, wherein said instructions further operate to:
    acquire a list of nodes in the wireless mesh network and change a status of all nodes on said list of nodes to uninitialized before operation to identify neighbor nodes, wherein said uninitialized node is a first node on said list of nodes.

12. The article of claim 11, wherein said instructions further operate to:
    repeat operation to identify neighbor nodes, operation to generate a list, operation to calculate throughput metrics, operation to select a channel configuration, and operation to change a status for another node after operation to change said status of said first node.

13. An apparatus for use in a wireless mesh network, comprising:
    a controller to determine channel allocations for nodes within the wireless mesh network, said controller to:

acquire a list of nodes in the wireless mesh network;
set all nodes on said list of nodes to a status of uninitialized; and
for each successive node on said list of nodes:
  identify neighbor nodes of said node that have been initialized, said neighbor nodes being capable of supporting a direct wireless link with said node;
  generate a list of channel configurations for said node that satisfy a predetermined connectivity constraint with respect to said identified neighbor nodes;
  calculate throughput metrics for channel configurations on said list;
  select a channel configuration for said node based on said throughput metrics; and
  change a status of said node to initialized after said channel configuration has been selected for said node.

14. The apparatus of claim 13, wherein:
said predetermined connectivity constraint requires at least one common channel with each of said identified neighbor nodes.

15. The apparatus of claim 13, wherein:
said controller calculates a throughput metric for a channel n within a channel configuration using the following equation:

$$TP = \frac{(100)}{((\# \text{ of direct neighbors using channel } n) + (\# \text{ of two hop neighbors using channel } n))}.$$

16. A system for use in a wireless mesh network, comprising:
at least one dipole antenna to act as a transition to a wireless communication channel;
a controller, in communication with said at least one dipole antenna, to determine channel allocations for nodes within the wireless mesh network, said controller to:
acquire a list of nodes in the wireless mesh network;
set all nodes on said list of nodes to a status of uninitialized; and
for each successive node on said list of nodes:
  identify neighbor nodes of said node that have been initialized, said neighbor nodes being capable of supporting a direct wireless link with said node;
  generate a list of channel configurations for said node that satisfy a predetermined connectivity constraint with respect to said identified neighbor nodes;
  calculate throughput metrics for channel configurations on said list;
  select a channel configuration for said node based on said throughput metrics; and
  change a status of said node to initialized after said channel configuration has been selected for said node.

17. The system of claim 16, wherein:
said predetermined connectivity constraint requires at least one common channel with each of said identified neighbor nodes.

18. The apparatus of claim 16, wherein:
said controller calculates a throughput metric for a channel n within a channel configuration using the following equation:

$$TP = \frac{(100)}{((\# \text{ of direct neighbors using channel } n) + (\# \text{ of two hop neighbors using channel } n))}.$$

* * * * *